United States Patent [19]

Cantley

[11] 4,439,997

[45] Apr. 3, 1984

[54] ENERGY MANAGEMENT SYSTEM FOR MULTI STAGE REFRIGERATION SYSTEMS

[76] Inventor: Robert J. Cantley, 905 Versailles Ct., Maitland, Fla. 32751

[21] Appl. No.: 338,673

[22] Filed: Jan. 11, 1982

Related U.S. Application Data

[62] Division of Ser. No. 244,161, Mar. 16, 1981, Pat. No. 4,325,223.

[51] Int. Cl.³ ............................ F25B 7/00; F04B 41/06
[52] U.S. Cl. .................................... 62/175; 62/228.3; 417/2
[58] Field of Search ..................... 62/510, 175, 228.3; 417/2

[56] References Cited

U.S. PATENT DOCUMENTS

| | | | |
|---|---|---|---|
| 3,184,926 | 5/1965 | Blake | 62/510 X |
| 3,495,418 | 2/1970 | Kapich | 62/510 X |
| 3,759,052 | 9/1973 | Inoue | 62/510 X |

*Primary Examiner*—William E. Wayner
*Attorney, Agent, or Firm*—Duckworth, Allen, Dyer & Pettis

[57] ABSTRACT

A system and method for managing energy in large multistage refrigeration systems and the like having a hot gas defrosting system by continuously monitoring operating parameters and controlling to optimize the refrigeration system compressor pressures and defrosting cycles. A multiplicity of remote sensors is disposed at the appropriate points in the refrigeration system to produce analog electrical signals representative of the evaporator air temperature, evaporator refrigerant temperature, and similar temperatures, and pressures such as the head pressure, booster suction pressure, intermediate suction pressure, and the like. A signal processor is provided to receive signals from the sensors, to condition the analog signals, convert to digital signals and to feed a digital computer which has a memory for storing system design pressure and temperature parameters and refrigerant characteristics. The digital computer calculates the instantaneous system operating parameters from the digital signals, compares these parameters to the design parameters, and operates control relays to load and unload compressors to maintain optimum system pressures, to energize and deenergize fans and pumps in accordance with the system requirements, and to energize defrost cycles only wnen necessary.

5 Claims, 9 Drawing Figures

ENERGY MANAGEMENT SYSTEM FOR MULTI STAGE REFRIGERATION SYSTEMS

This is a division, of application Ser. No. 244,161 filed Mar. 16, 1981 now U.S. Pat. No. 4,325,223.

BACKGROUND OF THE INVENTION

1. Field of the Invention

The present invention relates to an integrated energy management system for refrigeration systems and more particularly to a method and system for automatically controlling certain functions of a refrigeration system to minimize the energy costs and to provide the user with continuous data on parameters of the system.

2. Description of the Prior Art

Over the recent decades, the use of refrigeration systems and air conditioning systems has grown to the point that such systems represent a major consumer of electrical energy in the United States as well as in many of the major industrial nations of the world. The designs for such systems developed during a period when electrical energy was extremely cheap. Efficiency often was relegated to a secondary factor in such designs with the initial cost being a primary factor. However, in recent years with the shortages of fossil fuels for producing electrical energy and the continuing increase in demand for electrical energy has led to significant improvements in the design to minimize input power, both in the interest of conservation of energy and the reduction of operating costs.

As is well known, the price of electricity has continued to spiral upward to the point that operating costs may dominate over capital investment costs. This situation is particularly severe with respect to large industrial refrigeration systems, such as those having capacities from 100 tons to 1,000 tons and greater. To illustrate, a 1,000 ton refrigeration system, designed to the state of the art, may have an annual operating cost of over $400,000.00 for power at 0.5¢ per kilowatt hour. This number assumes that the system is operating at its design parameters and that all of the components are operating at their maximum efficiencies.

SUMMARY OF THE INVENTION

My invention is an energy management system for large refrigeration systems which generally have one or more evaporative condensers. This system comprises four basic elements. First, a plurality of sensors is provided which sense various system pressures and system temperatures at the appropriate points. The system is adaptable to being installed in an existing refrigeration system and may, of course, be an integral part of a new installation. The pressure and temperature sensors are of the electrical type and I prefer types which can be utilized with relatively long leads to permit location of each sensor at a convenient location.

Second, the sensing elements are connected to a microcomputer system which includes signal processing circuits and analog-to-digital converters which produce digital output signals from the various analog parameter measurements from the sensors.

Third, a programmable memory system is provided and is programmed with the various design parameters of the refrigeration system into which the energy management system is installed. The computer is programmed to scan the various sensor inputs and to store the readings of each input. The computer calculates a number of measures of system performance by various algorithms and the measures are compared to the various stored parameters. Numerical readouts are then provided for various parameters which are of significance to the operator.

Fourth, the computer includes an interface unit which is connected into the refrigeration system such that control of certain components of the refrigeration system may be effected as required by the system conditions. A printer is included which will periodically print out status reports for the system. Alarm signals are provided which, if certain faults occur in the refrigeration system which would decrease its efficiency, alerts the operator to take maintenance actions. An evaporator is in the area to be cooled by the refrigeration system and I provide temperature sensors to monitor the air temperature in the evaporator and the temperature of the vaporized refrigerant at that point.

The compressor discharge or head temperature is measured in my system between the condensers and the receiver. This location takes into account the pressure drop across the condensers. The input pressure or compressor suction is measured by a pressure transducer installed between the intercooler and the main compressors. The pressure between the evaporator and the booster compressor, termed the booster suction, is measured by a transducer installed at that point. Pressure sensor data from the refrigeration system are applied to conditioning circuitry which filters, amplifies and scales the measured parameters. The microcomputer is under software control which causes it to scan the input sensors one at a time. After selecting a sensor signal for its input, the computer receives a binary number equivalent to the value of the data at that time from the A/D converter. After a scan of all the input sensors is accomplished, the stored digitized data have conversion algorithms applied thereto and the various calculations performed. The parameters to be displayed are converted to an equivalent binary coded decimal format for operation of the front panel displays. The interface unit includes solid state control relays which are activated or deactivated according to results of analysis of the data. The computer may also be programmed to produce trend analysis, and a summary of the data trend and control information may be printed out on the printer at selected intervals.

For convenience, the following is a list of symbology used herein:

| Pressures | |
|---|---|
| $P_h$ | main compressor discharge pressure at receiver input. |
| $P_{ms}, P_s$ | main compressor suction pressure. |
| $P_{bs}$ | booster compressor suction pressure. |

It is therefore a principal object of my invention to provide an energy management system which can be connected to refrigeration systems and the like which will control the operation thereof continuously and automatically to optimize the performance and to minimize the operating costs.

It is another object of my invention to provide an energy management system for multi-stage refrigerator systems which will optimize the intermediate suction pressure and the operation of the defroster.

It is yet another object of my invention to provide an energy management system for large refrigeration systems which will provide visual and audible alarms for certain conditions which reduce the efficiency of the refrigeration system.

It is still another object of my invention to provide an energy management system having a multiplicity of temperature and pressure transducers that can be installed at key points in the refrigeration system and an electronic system for receiving electrical signals from the transducers for monitoring all of the key operating parameters.

It is a further object of my invention to provide an energy management system in which an electronic control system evaluates key system parameters, performs continuous calculations of factors defining the operating efficiency of the system, and automatically controls various components in the refrigeration system so as to optimize the operation of the refrigeration system with respect to operating costs.

It is yet a further object of my invention to disclose a method of monitoring and controlling large refrigeration systems to minimize the operation costs thereof.

These and other objects and advantages of my invention will become apparent from the following detailed description and the drawings.

DETAILED DESCRIPTION OF THE PREFERRED EMBODIMENT

Figure 1:
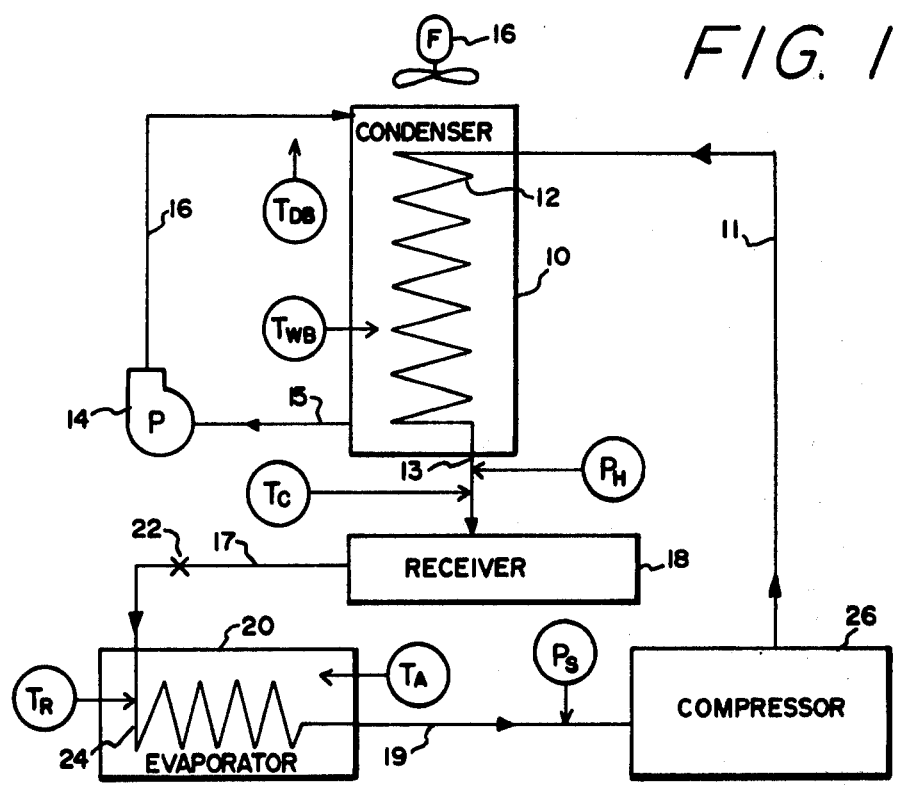
FIG. 1 is a simplified schematic diagram of a single stage refrigeration system showing points of parameter measurement.
Figure 2:
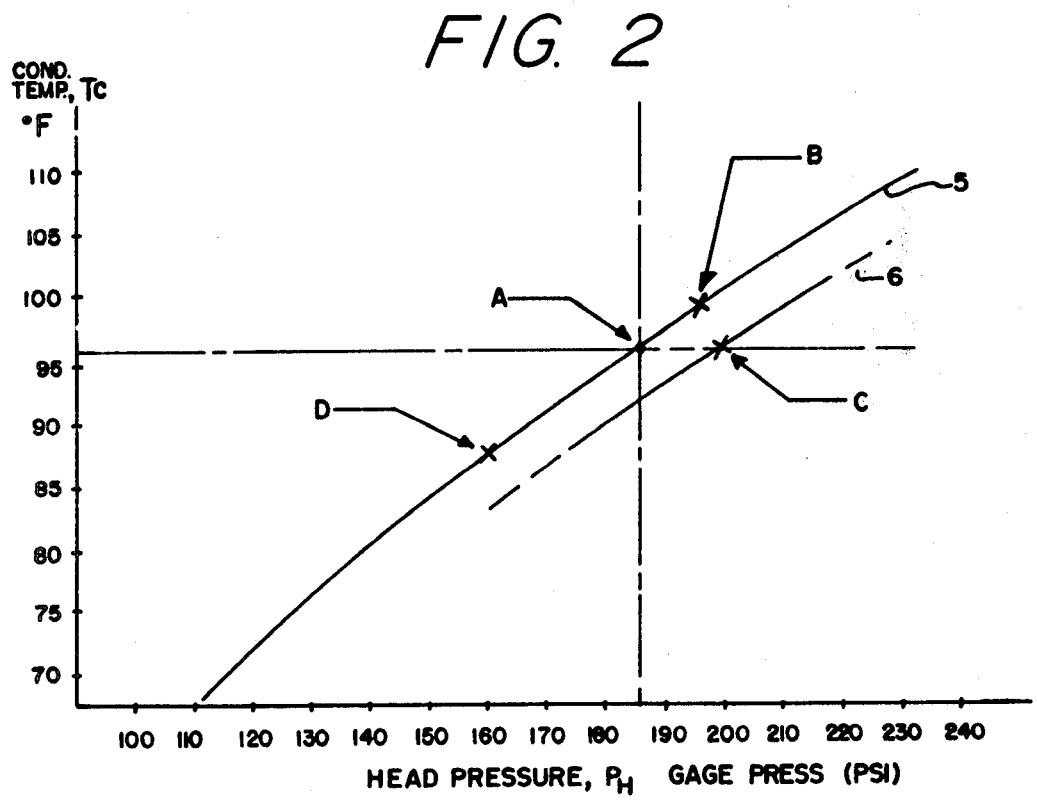
FIG. 2 is a graph of ammonia pressure versus condensing temperatures.

Referring to FIG. 1 of the drawings, a schematic diagram of a single stage refrigeration system having an evaporative type condenser is shown. The system consists basically of the evaporative condenser 10 having a coil 12 for receiving the refrigerant in its gaseous state under pressure from compressor 26 via line 11. Water is drawn from a sump via line 15 by pump 14 and introduced at the top of the condenser via line 16. The water is generally sprayed over the coils 12 such that a film of water on the outside of the coils will be evaporated removing heat to condense the gaseous refrigerant to its liquid state. A fan 16 operates to move air across the coils to carry away the latent heat produced. The condensed refrigerant is collected in receiver 18 via line 13 from which it flows under pressure via line 17 to expansion valve 22. It is, of course, to be understood that some refrigeration systems of this type utilize other means for producing expansion of the liquid refrigerant. The liquid refrigerant expands in the evaporator 20 as it changes to its gaseous state and absorbs heat from the ambient air moving through the evaporator. From the evaporator coil 24, the gaseous refrigerant is drawn via line 19 into compressor 26 which compresses the gas and causes it to flow back to the condenser.

My invention comprises an energy management system which may be connected to a refrigeration system such as that shown in FIG. 1. My system will monitor and measure certain critical parameters of the refrigeration system such as at the points indicated in FIG. 1.

Two important parameters that provide information as to the efficiency of the refrigeration system are the compressor discharge pressure or head pressure $P_h$, and the temperature of the condensed refrigerant which flows into receiver 18, $T_c$. Measurements of these parameters taken on line 13 from condenser 10 to receiver 18 will therefore provide important operating information. An additional pressure reading which, when combined with the head pressure $P_h$, will indicate the efficiency of the compressor is the suction pressure $P_s$ at the input to the compressor 26 measured on line 19.

My system may also require measurements of the refrigerant temperature in the evaporator coil 24 and the temperature of the air flow through the evaporator $T_a$. Although I have shown in FIG. 1 the main parameter measurements required for operation of my energy management system, certain other measurements may be made for special purposes as will be discussed more fully below.

Figure 3:
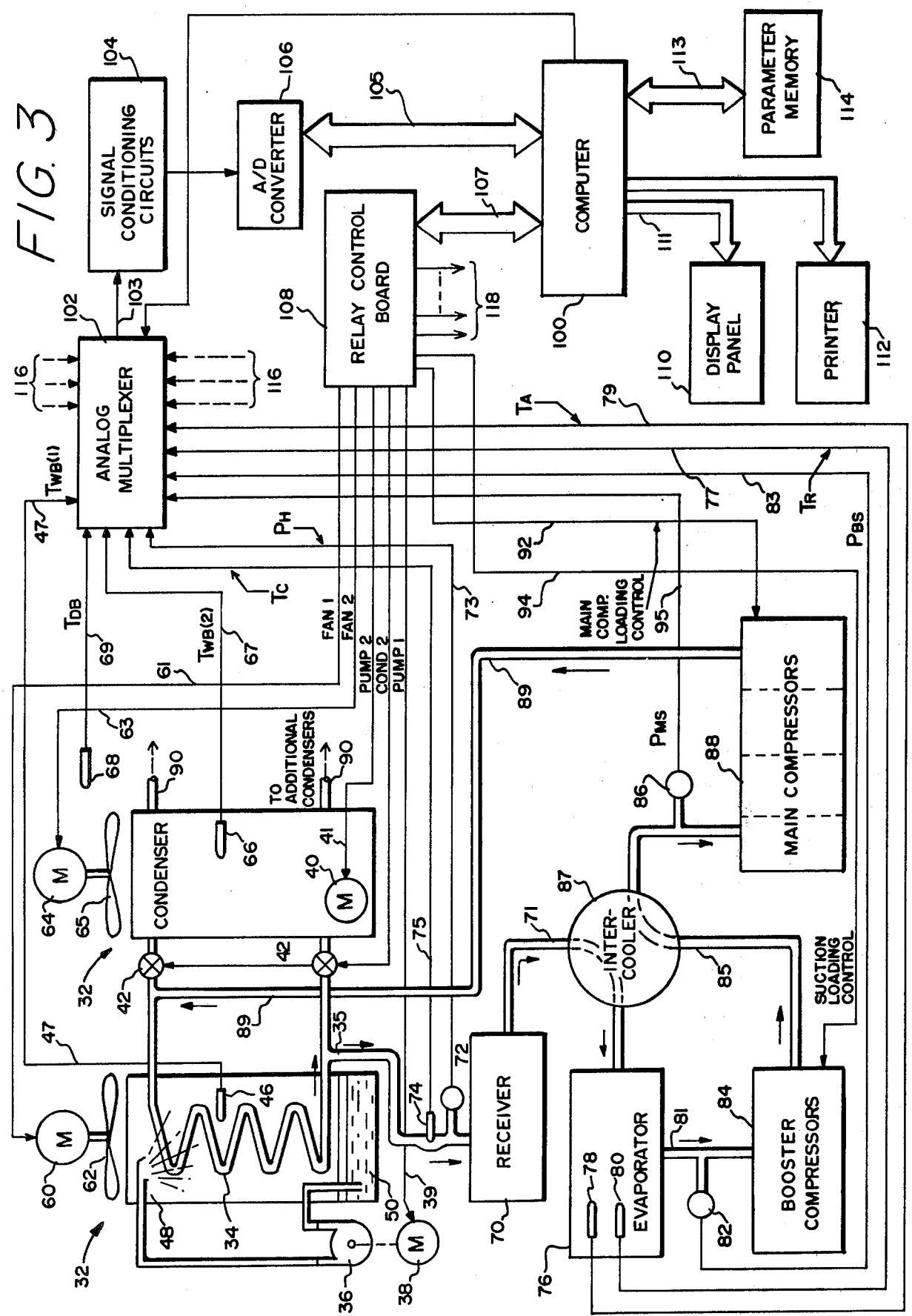
FIG. 3 is a functional block diagram of the energy management system connected to a two stage refrigeration system.

In FIG. 3, I have shown a functional block diagram of a large two-stage refrigeration system having a set of sensors installed therein connected to a functional block diagram of the energy management system of my invention.

A two stage system as illustrated may be used when very low temperatures are required. For example, the room controlled by evaporator 76 may require a −30° F. temperature. Intercooler 87 is utilized to subcool the refrigerant from receiver 70 down to 18° F., for example. Thus, the refrigerant has a greater capacity for heat absorption in the evaporator 76. For this two stage system, a booster compressor 84 is required which draws the refrigerant from evaporator 76 and may typically raise its pressure from 9 inches of water vacuum to 25 psi at its output on line 85. The temperature of the refrigerant at the input to booster compressor 84 may be on the order of −40° F. for this example and 110° F. at the output. Intercooler 87 operates to remove much of the superheat picked up from the booster compressor such that the refrigerant entering the main compressor may be at about 12° F. at 25 psi. The main compressor 88 then raises the pressure of the refrigerant to, for example, 185 psi in a typical system. The temperature of the gaseous refrigerant may be in the range from 108° F. to 285° F. The compressed gas flows via line 89 to the coil 34 in condenser 30, and to condenser 32 and additional condensers if valves 42 are open. For purposes of discussion, consider that valves 42 are closed and that only condenser 30 is operational. Water from sump 50 is pumped via pump 36 to spray system 48 to maintain condenser coil 34 coated with a film of water on its surfaces. A fan system 62 driven by motor 60 is shown schematically and it is to be understood that each condenser may have multiple fans. Air from fans 62 flows through coils 34 carrying the evaporated water and its latent heat away from the coils, normally to the outside air. Pump 36 is driven by motor 38. I have indicated main compressors 88 representing a number of paralleled compressors which are controlled to cut in and out with variation in load.

To illustrate the operation of my energy management system, I have shown a number of sensors disposed at the appropriate points in the exemplary refrigeration system. It is to be understood that the management system will accommodate additional sensors which may be necessary when multiple compressors and/or multiple condensers are used.

Temperature sensor 80 is disposed in the evaporator 76 so as to be in contact with the refrigerant flowing through the evaporator. This sensor measures temperature $T_r$ and is connected to signal multiplex circuit 102 by lead 77. Temperature sensor 78 is installed in the air stream flowing through evaporator 76 to measure the air temperature $T_a$ being controlled by the refrigeration system. Sensor 78 is connected to signal multiplex circuit 102 via leads 79.

For this illustrated refrigeration system, pressure measurements on this system are obtained by a set of electrical pressure transducers. Transducer 72, connected to the output line 35 from the condensers, measures the head pressure $P_h$ and is connected to signal multiplex circuit 102 via leads 73. Transducer 86 measures the suction pressure at the input of main compressor 88 $P_{ms}$ and transducer 82 measures the suction pressure $P_{bs}$ at the input of booster compressor 84. As may be noted, additional inputs 116 to signal multiplex circuit 102 may connect to sensors and transducers in additional condensers and compressors, not shown.

As may now be understood, the signals from the temperature sensors and pressure transducers are multiplexed and conditioned in signal by circuits 102 and 104 to provide a number of analog voltages, each proportional to one of the measured system parameters. Conditioning circuits element 102 is connected via bus 103 to multiplexer 104 which is controlled by microcomputer 100 to scan each of the parameter voltages in a preselected sequence. When a voltage is sensed by circuits 104, it is transferred to analog-to-digital converter 106 which produces a binary number proportional to the original voltage amplitude. The output from A/D converter 106 is connected to microcomputer 100 by bus 105. The microcomputer 100 also is connected via bus 113 to parameter memory 114. All of the pertinent system data for the refrigeration system to be controlled is stored in parameter memory 114 including: the head pressure/condenser temperature relationship for the particular refrigerant used, which is commonly ammonia; the design parameters of wet bulb and dry bulb readings; maximum system capacity; design head pressure and condensing temperature power consumption of all fan and pump motors in the system; power consumption of main compressors as a function of head pressure and other parameters; cost of power; and other required preselected data such as values of thresholds for alarms and the like.

The microcomputer is programmed to continuously calculate various measures of the operation of the refrigeration system as will be described in more detail below. As will be seen, a number of conditions may exist in which maximum efficiency and therefore minimum energy will be obtained when various pumps and fans are shut down. Therefore, relay control board 108 is provided connected to microcomputer by bus 107.

It is to be understood that the main compressors 88 will include well known mechanisms for controlling the refrigerant volume in accordance with the refrigeration load. However, as will be obvious to those of skill in the art, my energy management system can also monitor the demand on the main compressors 88 and provide the necessary control function. Thus, in a custom design refrigeration system incorporating my energy management system as an integral part thereof, more precise control of the compressors can be provided. For example, leads 92 from relay control circuits 108 control the main compressor loading and leads 94 to booster compressor 84 permits control of intermediate pressure at the input to main compressors 88.

Associated with microcomputer 100 via bus 111 are display panel 110 and printer 112. Display panel 110 provides digital readouts for each function monitored by the various sensors and transducers. This permits the operator to determine at a glance the operating condition of the refrigeration system. Additional readouts, such as the cost per ton per hour for operation of the refrigeration system, are provided with the readout determined by the microcomputer from stored information such as the cost per kilowatt hour for electrical power and calculations based on the readings obtained from the sensors. Microcomputer 100 controls printer 112 to print out reports at periodic intervals, which can be selected by the operator, of system status, system history, and trends of system operation. Such statistical information, not available in prior art systems, can alert the users of the refrigeration system to significant changes in the use of the refrigeration system which might indicate necessity for increasing capacity, adding additional condensers, or due to a reduction in refrigeration capacity needed, a reduction in size of main motors and the like which could permit smaller motors to be substituted with a significant saving in operating costs.

Although not shown in the refrigeration system of FIG. 3, a defrosting system must be provided for evaporator 76 since ice and frost will build up on the coils and reduce the cooling efficiency. In prior art control systems for refrigeration systems, it is common to cycle a defrost system on periodically; for example, the evaporator is operative for 20 minutes, and is then switched to the defrost mode for 2 minutes. However, when a controlled space is operated under high moisture infiltration conditions and under high load, the evaporator can become fouled with frost quickly. The defrost cycle may be too long under such conditions. Conversely, at night and during weekends during which moisture infiltration is minimum, the cycle may be too short.

Figure 4:
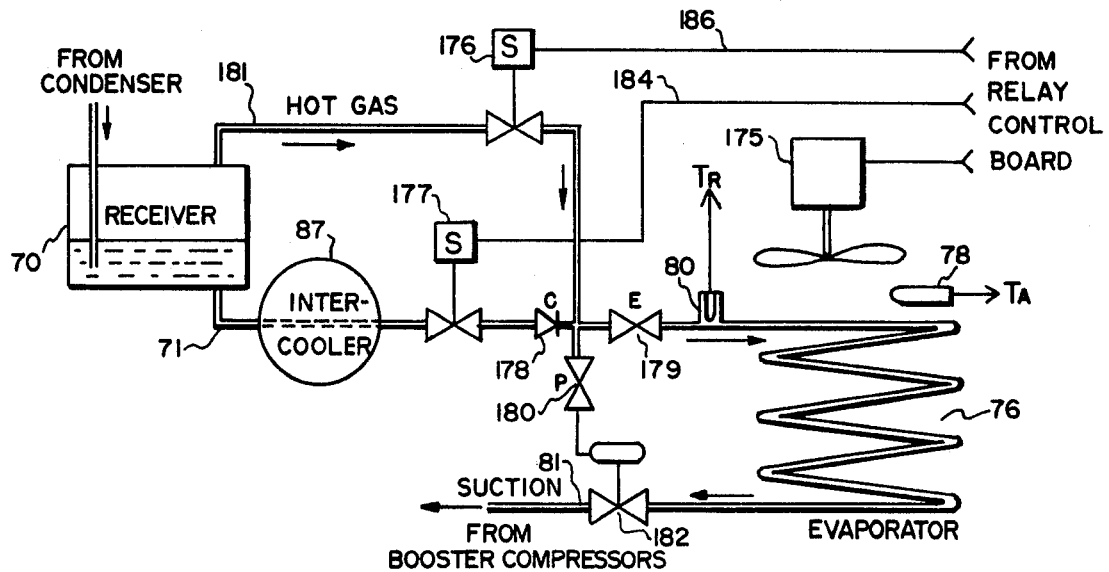
FIG. 4 is a functional diagram of a defrost system for the system of FIG. 2.

Advantageously, my energy management system monitors the evaporator conditions and automatically controls defrosting to occur only when needed. Turning now to FIG. 4, a typical defrost arrangement is shown illustrating my control system based on the difference $\Delta T_e$ between refrigerant temperature $T_r$ and the temperature $T_a$ of the air flowing across the evaporator rather than on a time cycle. In accordance with the refrigeration system design, a maximum $\Delta T_e$ is selected based on the maximum load. For illustration, a $\Delta T_{e(d)}$ of 15° will be assumed from $T_a = -40°$ F. and $T_r = -25°$ F. Thus, under full load conditions, the refrigerant from expansion valve 179 will be flowing through coil 76 at $-40°$ F. as measured by temperature sensor 80 and the air flow from fan 175 will have a temperature of $-25°$ F. as measured by sensor 78. As frost builds up on coil 76, the heat transfer efficiency of evaporator coil 76 will be reduced and the air temperature will rise. For an amount of increase determined experimentally, the defrost system will be activated.

The flow of liquid refrigerant from receiver 70 to evaporator 76 is cut off by solenoid valve 177 via lead 184 from the relay control board of the energy management system. Solenoid valve 176 is opened via lead 186 which permits hot gaseous refrigerant from receiver 70 to flow through coil 76 to quickly melt collected frost. Pilot valve 180 is activated by the hot gas to open valve 182. Fan 175 is turned off during defrost. After defrosting for a predetermined period, the energy management system returns valve 176 to off, valve 177 on, and fan 175 on. Pilot valve 180 will return to off as well as spring valve 182.

The value of $\Delta T_e$ is also utilized to decrease system operating costs under light loads, such as at night and on weekends. For example, if the load is reduced such that $\Delta T_e$ drops to 5° F., evaporator fan 175 can be cut off. For a large refrigeration system, the evaporator fan motors may be 100 Hp. If a 50% fan duty factor on each weekend can be achieved, the reduction in heat load due to fan motors and the reduction in power consumption for a 5¢/kwhr power cost, a savings of over $8,000.00 per year will result.

Figure 5:
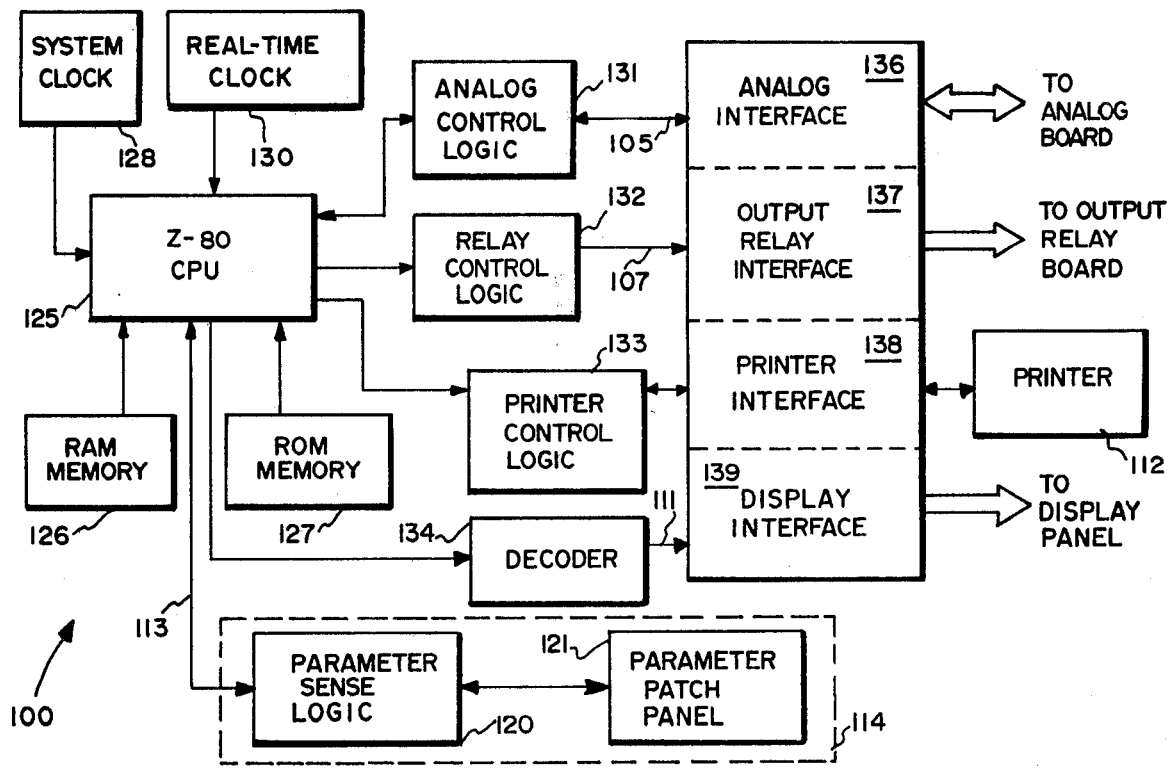
FIG. 5 is a block diagram of the computer board.

Details of the computer controls of my energy management system will now be given with reference to FIGS. 5 through 8 which illustrates the elements thereof, referred to herein as "boards". FIG. 5 is a block diagram of the CPU board 100 which utilizes an 8-bit Z-80 microprocessor 125. System clock 128 produces the basic system bit rate. A real time clock 130 is provided to permit real time preprogramming of the computer system when desired. Random access memory (RAM) 126 supplies 16K bytes of memory. Programmable read-only memory (ROM) 127 stores the operational program for CPU 125 as well as the various calculation algorithms and similar data. Parameter memory 114 includes parameter sense logic 120 and parameter patch panel 121. Parameter patch panel 121 is comprised of a multiplicity of 10×10 matrices connected to BCD encoders which may be, for example, 74LS147 integrated circuits. Matrices may be utilized to store installation-specific parameters such as: system capacity; power drain of the drive motors in the refrigeration system; cost of electrical power; and refrigeration system design parameters such as ambient temperature, wet bulb temperature, head pressure, and condensing temperature. The patch panel 121 may be manually programmed at installation and changed when required due to modification of the refrigeration system. Thus, parameter memory 114 supplies CPU 125 with the necessary design data for comparison to operating data for monitoring of the performance of the refrigeration system.

Figure 6:
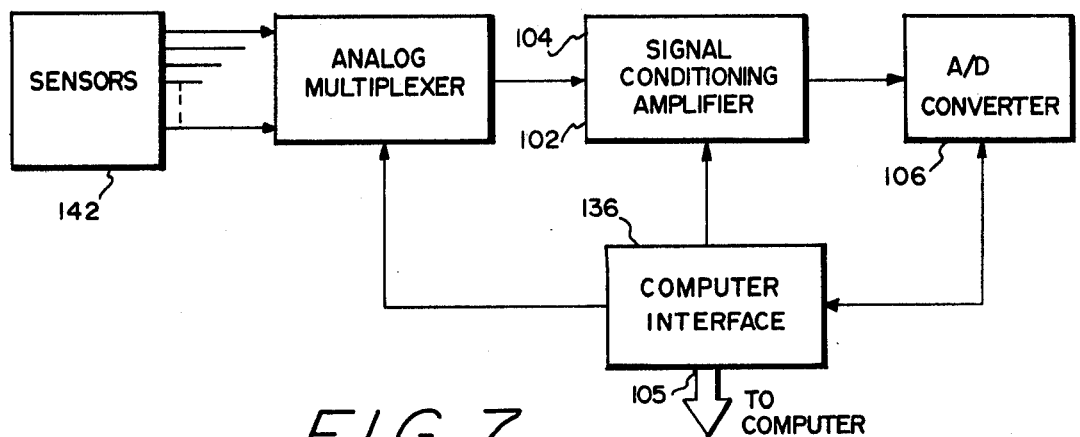
FIG. 6 is a block diagram of the analog signal input board.

The computer board 100 receives its input from the refrigeration system via analog interface 136 and bus 105 from the analog board shown in FIG. 6 in block diagram form. CPU 125 and analog control logic circuits 131 control the multiplexing of the input sensors 142 and the gain of amplifier 141 for each selected sensor. A/D converter 106 in the analog board of FIG. 6 produces binary coded signals as inputs to CPU 125 which utilizes the instantaneous pressure and temperature readings to compute the various system operating parameters.

Figure 8:
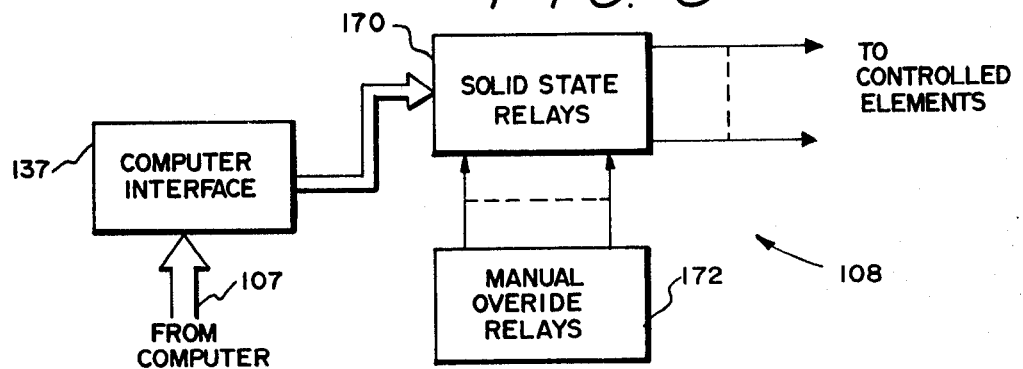
FIG. 8 is a block diagram of the output relay circuit board.

Computer control board 108, shown in block diagram form in FIG. 8, includes a set of solid state relays 170 connected to the refrigeration system to appropriately control each unit in the system as required by computer board 100 so as to maintain maximum operating efficiency of the refrigeration system at all times. A set of conventional electromagnetic relays 172 is provided having their contacts in parallel with the contacts of solid state relays 170. These relays are manually operable by a key-lock switch to override the solid state relays and also will automatically close in case of loss of power to the computer. Actuation of the manual override relays 172 will completely remove the control of the refrigeration system from the energy management system and therefore permit continuing operation of the refrigeration system in case of failure of the energy management system. CPU 125, in its continuous monitoring of the various pressure and temperature information obtained from sensors 142, will operate solid state relays 170 through relay control logic 132 and relay interface 137 to energize and deenergize the appropriate elements in the refrigeration system as indicated by the instantaneous conditions of the refrigeration system to thereby optimize efficiency and minimize operating costs.

Figure 7:
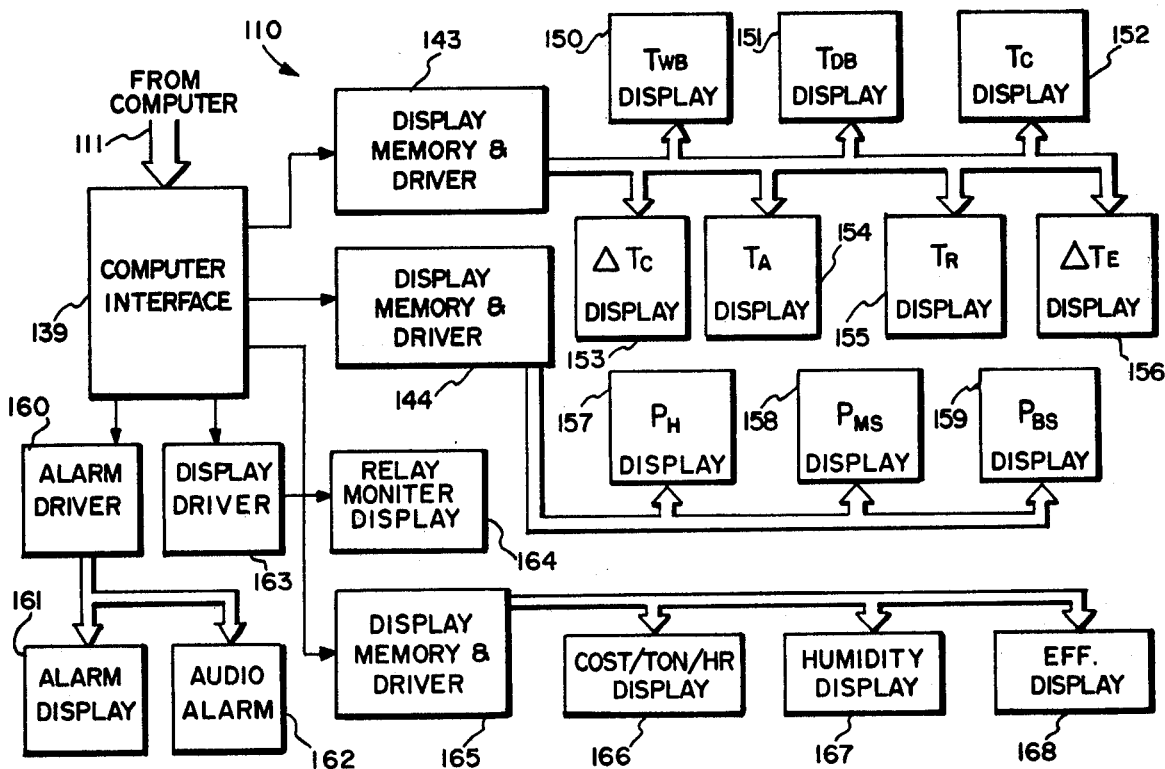
FIG. 7 is a block diagram of the display and alarm board.

Computer board 100 drives display board 110 shown in block diagram form in FIG. 7 via display interface 139 and bus 111. All alphanumeric displays may be 8-digit LED 7-segment types. The temperature displays are controlled by display memory and driver 143 which includes a multiplexer and circuitry to sequentially energize each of the seven temperature displays shown to minimize power consumption. The conditions in the evaporator are indicated by the air temperature and refrigerant temperature displays 154 and 155, respectively. Display memory and driver 144 multiplexes readings of head pressure, main suction, and booster suction as indicated by displays 157, 158 and 159, respectively.

Display board 110 also provides system alarms which may be of both visual and audible types. Alarm driver 160 will supply alarm signals to visual alarm display 161 and audible alarm display 162. The status of each of the solid state relays in the relay board FIG. 8 is indicated by a relay monitor display 164 operated via display driver 163 to indicate to the operator which elements of the refrigeration system are energized. Decoder 134 in computer board 100 of FIG. 4 produces the necessary coding from the output of CPU 125 to operate the displays of FIG. 7 via interface 139 and bus 111. In addition to instructing display board 110, CPU 125 controls a data logging printer 112 which may be, for example, an alphanumeric thermal printer to periodically log refrigeration system operating conditions and the various control operations effected. Printer control logic 133 generates the necessary handshake procedures to control printer 112 and is interfaced to the printer via a bit parallel, serial character interface 128.

Turning now to FIG. 6, sensors 142 are disposed at the appropriate point in the refrigeration system and connect to an analog multiplexer 102 and signal conditioning circuits 104. Multiplexer 102 may comprise two dual 8-channel analog multiplexers providing 16 channels of differential inputs. Multiplexers 102 may be types MPC8D and are under the control of the computer board 100 to sequentially select sensors at a scan rate of approximately ten samples per second. Thus, each sensor is sequentially connected by multiplexer 102 to signal conditioning amplifier 104. Under computer control, amplifier 104 will have its gain changed to scale the input parameter to fall within preselected limits. Amplifier 104, which may be a type 3606A, provides low drift, differential amplification and filtering to ensure high common mode and normal mode noise rejection as well as RFI/EMI immunity in harsh environments. The amplified signal from the sensor is directed to A/D converter 106 which may be a 13-bit quad slope unit, type AD7550. A/D converter 106 converts the input signal to an equivalent digital representation between maximum counts of −4095 and +4095. The digital signals then flow to the computer board 100 via interface 136.

Pressure transducers such as 72, 82, and 86 of FIG. 3 are preferably Beta pressure cells available from the BLH Company. These units produce a change in resistance with a change in pressure and have a rated output of 3 mV/V with an accuracy of ±0.5%. Excitation power to the pressure transducers includes provisions to correct for transducer cable resistive variations. The temperature transducers are preferably current devices, such as the model AC 2626 available from Analog Devices Company. This unit produces an output current linearly proportional to absolute temperature and has an output of 1 ua/deg C. Thus, the temperature inputs are insensitive to the length of the connecting cable. These sensors have an accuracy of ±0.5° C.

Figure 9:
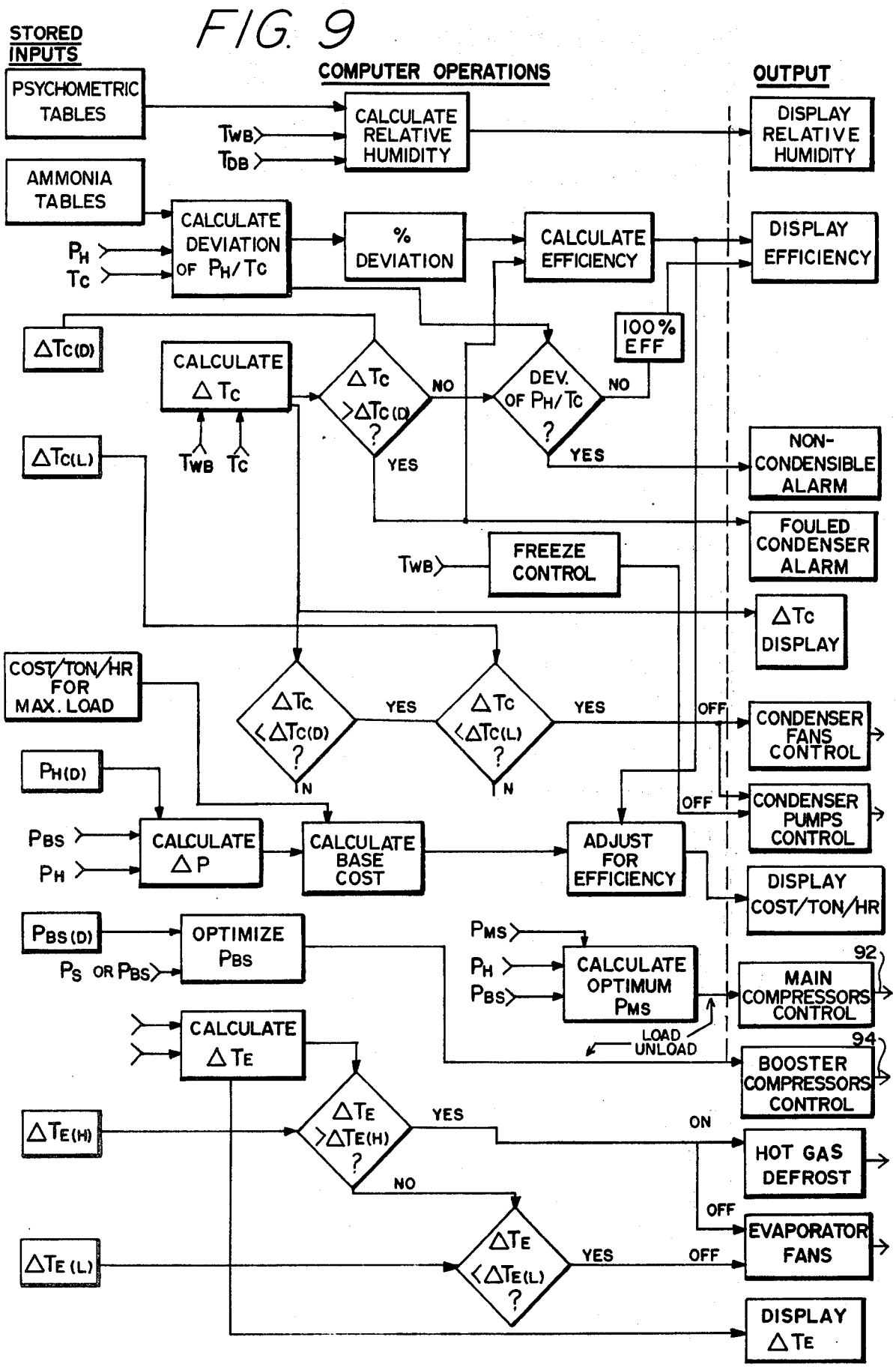
FIG. 9 is a functional flow chart of the computer operation of the energy management system of the invention.

A flow diagram of the various operations and calculations performed by the computer of my energy management system is presented in FIG. 9. Generally, input data stored in parameter memory 114 are indicated in the left hand column of the diagram and the various system output displays and controls are shown in the right hand column. The following are typical calculations performed by the computer from the readings of the various sensors and typical controls and displays which result from the calculations.

1. Optimum Intermediate Pressure Control

In a two-stage refrigeration system such as illustrated in FIG. 3, it may be noted that the intermediate pressure, which is referred to here as the main suction pressure $P_{ms}$, will depend upon the loading of booster compressors 84 and main compressors 88. In prior art refrigeration system, this value is preselected for maximum conditions. The optimum intermediate suction pressure $P_{ms}$ is calculated by the following equation:

$$P_{ms} = P_{bs}\sqrt{\frac{P_h}{P_{bs}}} \; ;$$

in which all pressure readings are in psi absolute. As may be recognized, when a prior art system operates at less than maximum load, the head pressure $P_h$ will drop with the result that the intermediate suction pressure is no longer optimum. This increases the cost to operate for lighter-than-maximum loads. Advantageously, my energy management system can continuously and automatically control the loading of the booster compressors and main compressors to always maintain the optimum intermediate pressure as the system loads vary from time to time. A design value of the booster suction pressure $P_{bs(d)}$ is selected during design and the value stored in the computer memory. The value of booster suction pressure measured by transducer 82 is continually compared to the design value to operate the booster compressors control so as to maintain booster suction at the design value by loading or unloading booster compressors 84. The measured value of the booster pressure $P_{bs}$ from transducer 82 and of head pressure $P_h$ from transducer 72 is used by the computer to calculate $P_{ms}$ as expressed in the equation above. Suction pressure $P_{ms}$ is monitored by transducer 86 and the main compressors control varies the loading of main compressors 88 to hold the intermediate pressure $P_{ms}$ at the value calculated for the measured head pressure $P_h$. Therefore, a minimum operating cost for the compressors is obtained at all values of system loading.

2. Defrost Cycle.

As discussed in detail above, defrosting of evaporator 76 is controlled by the value of $\Delta T_e$ rather than by a timing device as in prior art refrigeration systems. Accordingly, the evaporator air temperature $T_a$ and refrigerant temperature $T_r$ are utilized to calculate $\Delta T_e$. The value of $\Delta T_e$ at any given time is compared to the maximum design $\Delta T_{e(d)}$ to determine if the observed value is greater. If so, this indicates fouling of the evaporator coils from frost. Therefore, the hot gas defrosts control initiates a defrost cycle and the evaporator fan is turned off. As may be recognized, a close tolerance can be set on the amount $\Delta T_e$ is allowed to increase above its design value to initiate defrosting, and the evaporator can be defrosted when even a small amount of frost builds up. Thus, the defrost cycle may be very short and is only initiated when required. The same calculation of $\Delta T_e$ may be used to determine when the evaporator is very lightly loaded such that the evaporator fans can be shut down. A low threshold of $\Delta T_{e(d)}$ is selected empirically such that when $\Delta T_e$ drops to that value the evaporator fans are disabled. As $\Delta T_e$ then begins to increase due to the lack of fans to the point at which it exceeds the lower threshold, the fans will be reenergized. The lower $\Delta T_e$ threshold may be selected to produce about a 50% duty cycle for the evaporator fans under light load conditions. The value of $\Delta T_e$ calculated is displayed to inform the operator of the condition of the evaporator.

Although my invention has been disclosed with reference to two stage refrigeration system, it is equally applicable to other systems and applications involving compressors, condensers and evaporators, such as large air conditioning systems, distilling systems, systems employing cooling towers and others in which various controls depend upon the interrelationship of various operating parameters. It will also be obvious to those of skill in this art to make many modifications to the specific means illustrated without departing from the spirit or scope of my invention.

I claim:

1. An energy management system for a two-stage refrigeration system or the like having evaporative condensers, booster compressors, and main compressors, comprising:
    first pressure transducer connected in said refrigeration system to produce a first electrical signal representative of the head pressure;
    second pressure transducer means connected into said refrigeration system to produce a second electrical signal representative of the intermediate suction pressure;
    third pressure transducer means connected in said refrigeration system to produce a third electrical signal proportional to the booster suction;
    memory means for storing electrical signals representative of the preselected design value of booster suction pressure; and
    calculation and control means connected to said first, second, and third pressure transducers for receiving said first, second, and third electrical signals and to said memory, said calculation and control means for comparing said booster suction pressure signal to said stored design booster suction pressure signal, said calculation and control means controlling loading and unloading of said booster compressor to achieve said design booster suction pressure; and said calculation and control means calculating an optimum intermediate suction pressure from said first and third electrical signals from said first and third pressure transducers, said calculation and control means controlling said main compressors to achieve said optimum intermediate suction pressure.

2. The system as defined in claim 1 which further comprises:

a hot gas defrosting system associated with the evaporator of said refrigeration system;

a first temperature sensing bulb disposed in said evaporator to produce a fourth electrical signal representative of the air temperature in said evaporator;

second temperature sensor bulb disposed in contact with the refrigerant in said evaporator for producing a fifth electrical signal proportional to the refrigerant temperature;

a preselected design difference-temperature value between said air temperature and said refrigerant temperature stored in said memory means;

said calculation and control means connected to said first and second temperature sensor bulbs, said calculation and control means for calculating the temperature difference between said evaporator air temperature and said evaporator refrigerant temperature and thereafter comparing such calculated difference to said stored design difference, said calculation and control means energizing said hot gas defrosting system when such calculated difference is greater than said stored design difference.

3. The system as defined in claim 2 in which:

a preselected lower value threshold of the temperature difference between said evaporator air temperature and said evaporator refrigerant temperature is stored; and said calculation and control means deenergizing the evaporator fans when such calculated difference is less than said stored lower threshold value.

4. An energy management system for a refrigeration system having a hot gas defrosting system associated with the evaporator of said refrigeration system comprising:

a first temperature sensing bulb disposed in said evaporator to produce a first electrical signal representative of the air temperature in said evaporator;

a second temperature sensor bulb disposed in contact with the refrigerant in said evaporator for producing a second electrical signal proportional to the refrigerant temperature;

memory means for storing an electrical signal representative of a preselected design difference-temperature value between said air temperature and said refrigerant temperature;

calculation and control means connected to said first and second temperature sensor bulbs, said calculation and control means for receiving said electrical signals calculating the temperature difference between said evaporator air temperature and said evaporator refrigerant temperature and thereafter comparing such calculated difference to said stored design difference, said calculation and control means energizing said hot gas defrosting system when such calculated difference is greater than said stored design difference.

5. The system as defined in claim 4 in which:

an electrical signal representative of a preselected lower value threshold of the temperature difference between said evaporator air temperature and said evaporator refrigerant temperature is stored in said memory means; and said calculation and control means deenergizing the evaporator fans when such calculated difference is less than said stored lower threshold value.

* * * * *